United States Patent
Gehring et al.

(10) Patent No.: US 7,808,685 B2
(45) Date of Patent: Oct. 5, 2010

(54) METHOD AND SYSTEM FOR PRINTING A PRINT JOB USING A MEMORY DEVICE

(75) Inventors: Shane T. Gehring, Meridian, ID (US);
Vincent C. Skurdal, Boise, ID (US);
Mark L. Brown, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2568 days.

(21) Appl. No.: 10/353,750

(22) Filed: Jan. 28, 2003

(65) Prior Publication Data

US 2004/0145780 A1    Jul. 29, 2004

(51) Int. Cl.
*G03F 3/08* (2006.01)
(52) U.S. Cl. .................. 358/518; 358/1.16; 358/1.15; 710/62; 710/313
(58) Field of Classification Search .......... 358/518, 358/1.16, 1.15; 710/62, 313
See application file for complete search history.

(56) References Cited

U.S. PATENT DOCUMENTS

| | | | |
|---|---|---|---|
| 6,262,806 B1 * | 7/2001 | Hughes .............. 358/1.15 |
| 6,271,926 B1 | 8/2001 | Jacobs .............. 358/1.15 |
| 6,330,071 B1 | 12/2001 | Vidyanand .......... 358/1.15 |
| 6,426,801 B1 * | 7/2002 | Reed ............... 358/1.16 |
| 6,665,092 B2 * | 12/2003 | Reed ............... 358/1.6 |
| 6,733,329 B2 * | 5/2004 | Yang ............... 439/518 |
| 6,937,370 B1 * | 8/2005 | Nitta et al. ........ 358/518 |
| 6,948,792 B2 * | 9/2005 | Narusawa et al. ... 347/19 |
| 7,106,461 B2 * | 9/2006 | Kakigi et al. ...... 358/1.12 |
| 2002/0054350 A1 * | 5/2002 | Kakigi et al. ...... 358/1.16 |
| 2002/0113980 A1 * | 8/2002 | Reed ............... 358/1.6 |
| 2003/0011807 A1 * | 1/2003 | Montierth et al. ... 358/1.15 |
| 2003/0085942 A1 * | 5/2003 | Narusawa et al. ... 347/19 |
| 2003/0086006 A1 * | 5/2003 | Misawa ............. 348/231.99 |
| 2003/0167376 A1 * | 9/2003 | Koh ................ 711/115 |
| 2003/0229736 A1 * | 12/2003 | Shih ............... 710/62 |
| 2004/0060932 A1 * | 4/2004 | Chun .............. 219/714 |
| 2004/0246525 A1 * | 12/2004 | Coca .............. 358/1.16 |

* cited by examiner

*Primary Examiner*—Mark K Zimmerman
*Assistant Examiner*—Jacky X Zheng

(57) ABSTRACT

A method of printing a print job includes storing print job data on a non-volatile memory device that includes a connector for connection to a port of a printer.

2 Claims, 4 Drawing Sheets

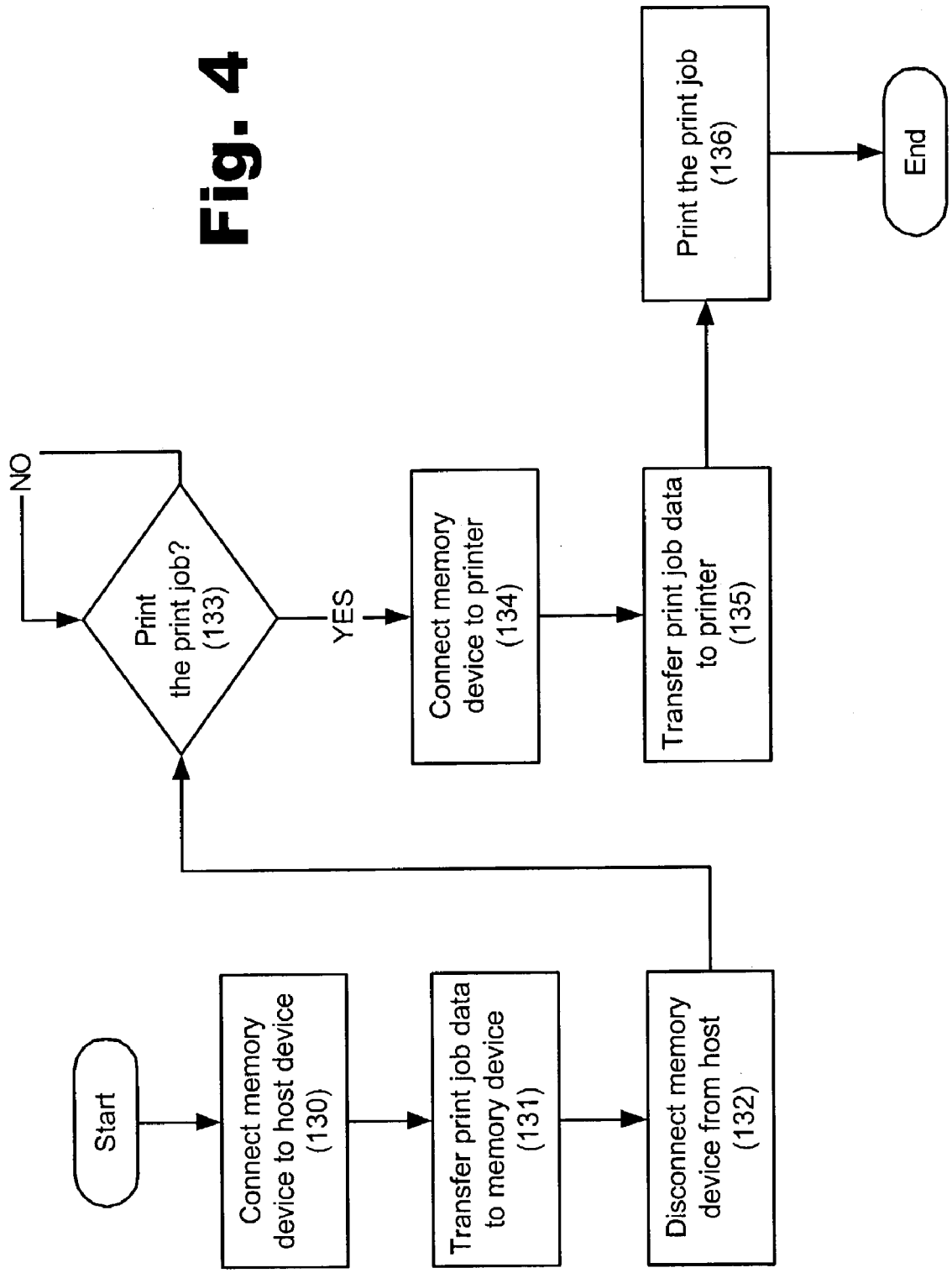

METHOD AND SYSTEM FOR PRINTING A PRINT JOB USING A MEMORY DEVICE

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Spreadsheet software allows a user to manage large amounts of financial and other types of information. Database software similarly allows a user to manage various databases of information such as, client contact information, address and phone number information or "to do" items.

Frequently, it is desirable to generate a hardcopy of a document or data set that is produced or stored on a personal computer or server. A hardcopy may be desired, for example, for record keeping purposes or to share with another party. Consequently, a wide variety of printers and printing devices have been developed that can receive a print job from a host computer and produce a hardcopy of the document or data represented by that print job.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, multi-function peripherals, and the like. A printer or printing device may produce images on a variety of print media that are in color or are monochromatic.

The term "print job" is defined as data that has been specifically formatted for submission to a particular printer from which the printer can generate a hardcopy representing an underlying data set from which the print job was created.

Most personal computers include programming that will be referred to generally as a "printer driver." A printer driver is a piece of software or firmware that receives data or a document to be printed from an application running on the computer. The printer driver formats the data for use by a corresponding printer, i.e., creates a print job, and then transmits the print job to the printer. Using the print job, the printer can produce a hardcopy of the underlying data or document.

Computer networks can interconnect a number of devices including personal computers, servers, data storage devices and printers. Using a computer network, a user can receive a data file generated elsewhere. If desired, this data file can be printed on a printer connected to the recipient computer in the same manner as data files that are originally created on that recipient computer. Additionally, a host computer may be connected to a printer through a network and may submit print jobs to that printer through the network.

With the use of computer networks, a user may be operating a networked computer that sends print jobs to a networked printer that is located in another room or at some distance from the networked computer. If the user is printing a document that is confidential or sensitive, the user may not want to send a print job over the network, have the job printed and sitting on the printer for some period of time before the user can retrieve it.

Additionally, a user may not know when or where a hardcopy of an electronic document will be wanted. Perhaps the user is traveling and does not wish to carry hardcopies of the document. The document could be stored on a floppy or optical disk. But having the document on a disk will cause the user to find a computer with a disk drive and printer where the computer has the right type of software to open and print the file from the disk. In addition, the capacity of media such as a floppy disk, is sometimes much too small for the files that are to be printed.

SUMMARY

In one of many possible embodiments, the present invention provides a method of printing a print job that includes storing print job data on a non-volatile memory device that includes a connector for connection to a port of a printer.

Another embodiment of the present invention provides a printer with a processor, a print engine controlled by the processor and a port for receiving a connector of a packaged non-volatile memory device. The processor is programmed to retrieve print job data stored on the memory device and use the print job data to drive the print engine to produce a corresponding hardcopy.

BRIEF DESCRIPTION OF THE DRAWINGS

The accompanying drawings illustrate various embodiments of the present invention and are a part of the specification. Together with the following description, the drawings demonstrate and explain the principles of the embodiments of the present invention. The illustrated embodiments are examples of the present invention and do not limit the scope of the invention.

FIG. 4 is a flowchart illustrating a method according to an embodiment of the present invention.

Throughout the drawings, identical reference numbers designate similar, but not necessarily identical, elements.

DETAILED DESCRIPTION

Figure 1:
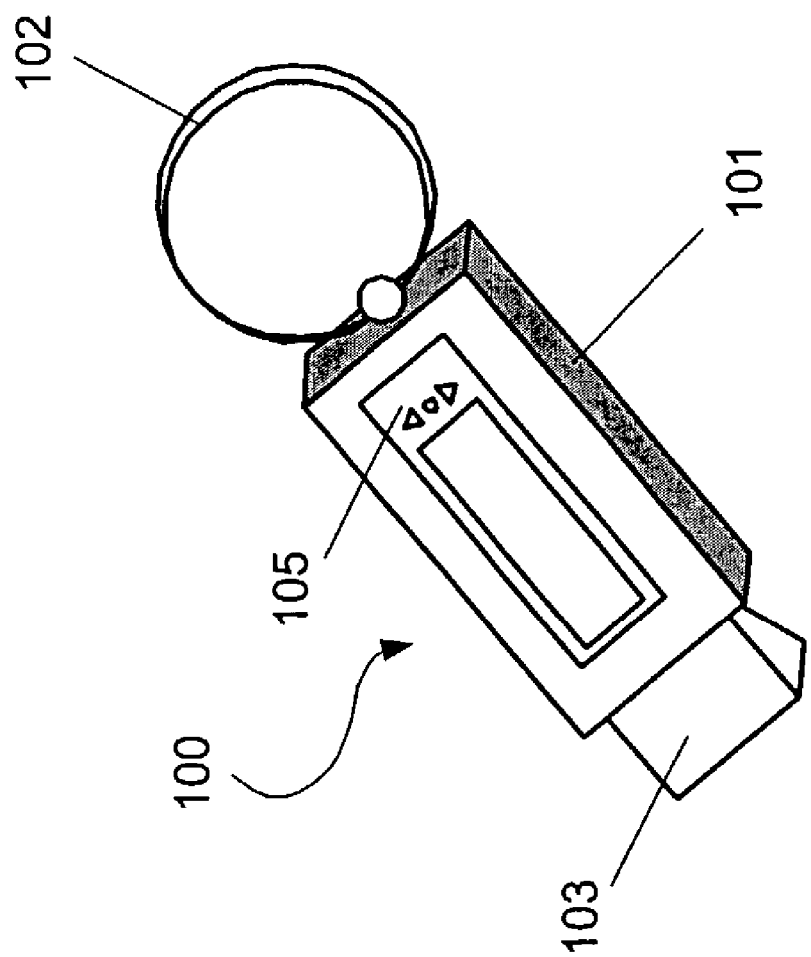
FIG. 1 is an illustration of a memory device which can be used to practice embodiments of the present invention.

A non-volatile memory unit can be used to hold a print job and transfer the data for the print job from a host computer to a printer. FIG. 1 is an illustration of a memory device that can be used to practice embodiments of the present invention. As shown in FIG. 1, a portable memory device (100) includes a packaged memory (101) and a connector (103).

The packaged memory (101) is preferably a non-volatile semiconductor memory unit encased in a protective cover. The memory unit (100) may include, for example, electrically erasable programmable read-only memory (EEPROM) or flash memory. Such memory units are widely used in computers and other electronic devices such as MP3 players, digital cameras, personal digital assistants, etc. Alternatively, other forms of non-volatile memory, other than semiconductor memory, may be used. For example, non-volatile memory types such as battery-backed static random access memory (SRAM), magnetic memory, small hard disks, etc., may be used in the packaged memory (101).

The memory device (100) also preferably includes a connector (103) with which to connect the packaged memory (101) to a host device. Preferably, the connector (103) is a Universal Serial Bus (USB) connector. This is because most computers and other electronic devices include one or more USB ports to which the memory device (100) could be connected using the connector (103), and USB has established operating system support allowing memory devices to be mapped as disk drives. However, any other type of connector may be used with the memory unit (100), so long as that connector can be used to allow a host device to write data to the packaged memory (101).

In some embodiments, a ring (102) may be connected to the memory package (101) to make the unit more manageable. For example, the ring (102) can be used to secure the memory device (100) on a key ring, necklace, belt loop, purse, laptop carrying case, etc. In some embodiments, the ring (102) may be replaced by a clip that can be used to clip the device (100) to some other item for safekeeping.

The device may also have a user interface (105) so that a user can control the memory device (100). For example, the user interface (105) may include a liquid crystal display (LCD) and keys or buttons allowing a user to scroll through data files stored on the device (100) and specify which file or files to download for printing. Alternatively, the user interface may include any user input device, for example, buttons, a keypad, a touch-sensitive LCD, a trackball, a joystick, a trackpad, and the like.

The user interface (105) may also be used to specify, for example, the number of copies to print, and other user selectable features. These parameters are then downloaded to a printer along with other print job data as illustrated and described below in connection with FIG. 2.

Figure 2:
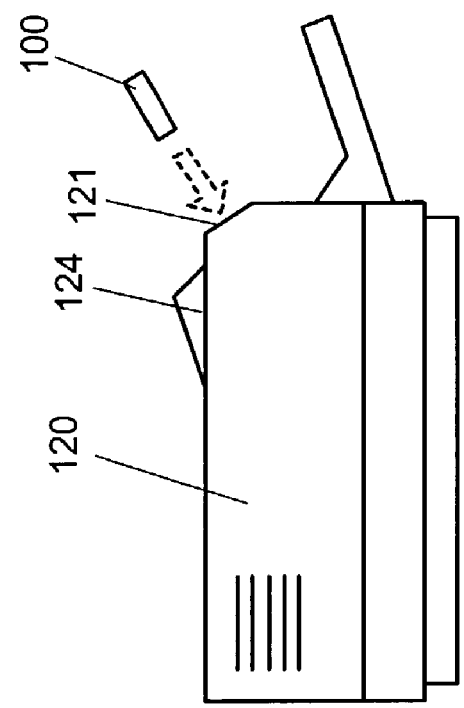
FIG. 2 is an illustration of a computer and printer with which embodiments of the present invention can be practiced.
Figure 2:
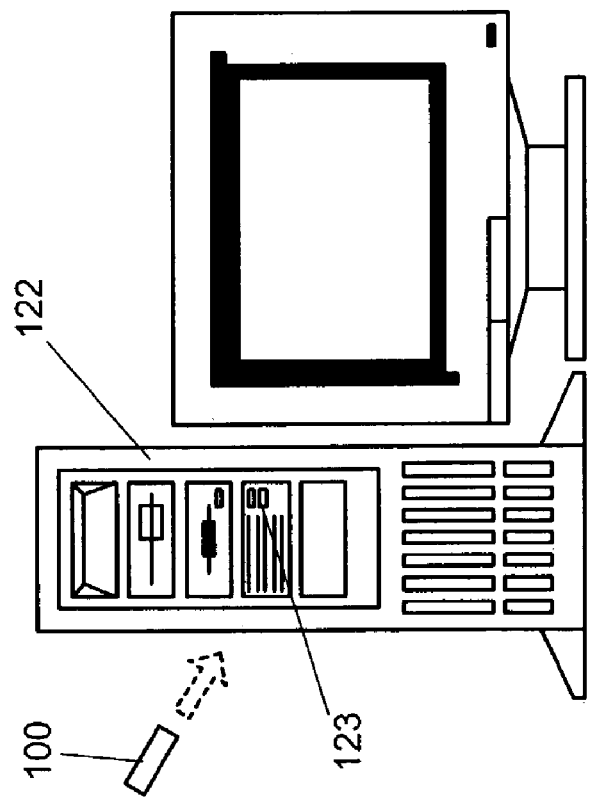

FIG. 2 is an illustration of a computer and printer with which embodiments of the present invention can be practiced. As shown in FIG. 2, the memory device (100) can be connected to a host device, such as personal computer (122). The computer (122) has a port (123) for receiving the connector (103, FIG. 1) on the memory device (100). As noted above, the connector on the device (100) is preferably a USB connector that can connect to a USB port of the computer (122). In other embodiments, the host device could be a server or any other device that stores or generates print job data.

When the memory device (100) is connected to the computer (122), a print job generated by the computer (122) can be downloaded in and stored on the memory unit (100).

A wide variety of applications may run on the computer (122), for example, a word processor, spreadsheet, graphics design program, e-mail manager, database manager, etc. Most such applications will include the capability of submitting data to a printer driver, also running on the computer (122). As described above, the printer driver will format the data for transmission to a printer so that the data can be understood by the printer and printed in hardcopy form. The printer driver will typically render the print data in a Page Description Language (PDL) or a printer command language (PCL). The result is data that can be transfer to a printer, i.e., a print job. The data may also be in a printer independent format, such as the Portable Document Format (PDF).

Once the print job data is generated, it is typically transmitted over a direct connection, or over a network, to a printer. However, with the memory device (100) connected to the computer (122), the print job data can be loaded into the memory device (100) rather than transmitted to a printer. Preferably, the data stored in the memory device (100) is in the same form as would be transmitted directly to a printer.

The user can then take the memory device (100) from the computer (122) and keep it until a hardcopy of the print job is needed. When a hardcopy is needed, the memory device (100) is connected to a printer (120) using the connector (103, FIG. 1) on the memory device (100). The print job data is then transferred to the printer (120) from the memory device (100). This transfer may be controlled through the user interface (105, FIG. 1) on the memory device (100) or through the user interface (124) of the printer (120).

Because the print job data in the memory device (100) is in the same form as would have been transmitted from the host device (122), the printer (120) can accept and process the print job in the memory device (100) in the same manner as any other print job that might be received from host device (e.g., 122). Thus, the printer (120) is able to produce the desired hardcopy or hardcopies using the print job data in the memory device (100).

As indicated above, the connector (103, FIG. 1) on the memory device (100) is preferably a USB connector. Most modern printers include a USB port (121) to which the memory device (100) could be readily connected. Printers may provide USB host functionality to provide the most convenient connection to the memory device, but other implementations may work as well.

In some embodiments, a USB or other port may be added to the front of the printer (120) as shown in FIG. 2. This allows easy access to the port (121) for connecting the memory device (100) to the printer (120). In other embodiments, the port (121) may be located at the rear or elsewhere on the printer (120).

With the arrangement shown in FIG. 2, a user can have greater control over the printing of a print job when desired. For example, if a user needs to print a confidential or sensitive document on a remote printer, rather than send the print job to the printer and have it printed and sitting on the printer until retrieved, the user can take the print job to the printer on the memory device (100), print the job and immediately retrieve the resulting hardcopy. Additionally, if the user is traveling and does not want to carry hardcopies of a document, the document can be stored in the memory device (100) and printed when needed.

In another scenario, the host computer (122) may not have any connection to a printer. Perhaps the user does not own a printer. In such a case, a print job can be stored on the memory device (100) and taken to a printer (120) where a desired hardcopy can be produced.

Figure 3:
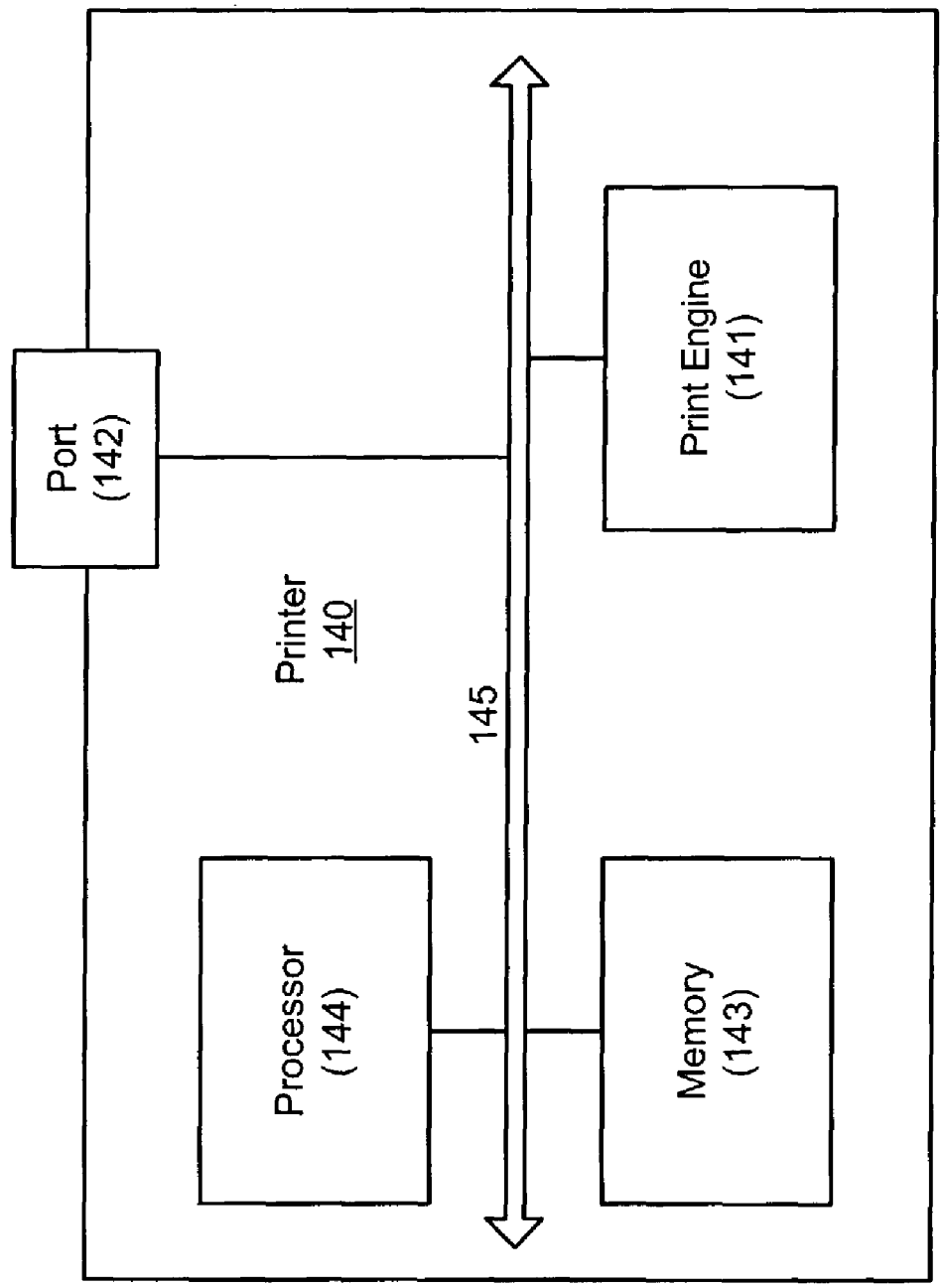
FIG. 3 illustrates the principal internal components of a printer with which embodiments of the present invention can be practiced.

FIG. 3 illustrates the principal internal components of a printer (140) with which embodiments of the present invention can be practiced. The various components of the printer (140) are preferably interconnected by a data bus (145).

As shown in FIG. 3, the printer (140) includes a processor (144). The processor (144) controls the operation of the printer (140), including a print engine (141). The print engine (141) includes the components to actually produce print on a print medium. For example, the print engine (141) may be a laser printing engine, an inkjet print engine, etc. The print engine (141) receives print job data under control of the processor (144) and produces the desired hardcopy.

A memory unit (143) is used to buffer print job data and to store programming for the processor (144). The firmware stored in the memory unit (143) is executed by the processor (144) to provide the functionality of the printer (140). The memory unit (143) may include a combination of non-volatile memory, e.g., read-only memory (ROM), and volatile memory, e.g., Random Access Memory (RAM).

The printer (140) also includes a port (142) for receiving a memory device (100, FIG. 2). As indicated above, the port (142) is preferably a USB host or USB-On The Go port, but this is not necessarily so. Data from the memory device (100, FIG. 2) enters the printer (140) through the port (142) and is treated by the processor (144) like any other incoming print job, such as a print job submitted to the printer (140) by a host device over a cable or network to which the printer (140) is connected.

FIG. 4 is a flowchart illustrating a method according to an embodiment of the present invention. As shown in FIG. 4, the memory device (e.g., 100, FIG. 1) is connected to a host device, preferably through a port of the host device. (Step 130). Next, print job data is transferred into the memory unit by the host device. (Step 131).

When the print job is stored in the memory device, the memory device is disconnected from the host. (Step 132). It will be understood that the memory device may receive more than a single print job from the host, or may store print jobs from a number of different hosts. Consequently, any or all of steps 130-132 may be repeated as desired.

The print job or jobs remain on the non-volatile memory device indefinitely. Non-volatile memory does not require a power source to maintain stored data. Thus, the data will be available when it is desired to print the print job stored on the memory device. (Determination 133).

The memory device is then connected to a printer. (Step 134). The memory device is preferably connected to a port of the printer through which the printer is configured to expect and receive print job data. As indicated above, this port may be a USB port.

Once the memory device is connected to the printer, the print job data is transferred from the memory device into the printer. (Step 135). This will typically occur in response to read signals transmitted to the memory device from the printer.

With the print job data downloaded to the printer, the printer can execute the print job and produce a corresponding hardcopy document. (Step 136). The user can preferably control the printer to produce multiple copies of the print job or to control various print options that may be available when printing the job, for example, duplex printing, color/monochromatic printing, etc. The control could be done using a user interface (105, FIG. 1) built into the memory device or could be accomplished through the user interface (124, FIG. 2) on the printer itself.

The preceding description has been presented only to illustrate and describe embodiments of the invention. It is not intended to be exhaustive or to limit the invention to any precise form disclosed. Many modifications and variations are possible in light of the above teaching.

The foregoing embodiments were chosen and described in order to illustrate some practical applications of embodiments of the invention. The preceding description enables others skilled in the art to utilize these principles in various embodiments and with various modifications as are suited to the particular use contemplated. It is intended that the scope of the invention be defined by the following claims.

What is claimed is:

1. A method of printing a print job, said method comprising:
    storing print job data on a non-volatile memory device that includes a connector for connection to a port of a printer;
    reformatting said print job data into a print job format used by the printer prior to storing said print job data on said memory device;
    controlling said memory device through a user interface disposed on said memory device;
    displaying files stored on said memory device with said user interface; and
    selecting files for printing with said user interface on said memory device.

2. A method of printing a print job, said method comprising:
    storing print job data on a non-volatile memory device that includes a connector for connection to a port of a printer;
    reformatting said print job data into a print job format used by the printer prior to storing said print job data on said memory device;
    controlling said memory device through a user interface disposed on said memory device; and
    selecting a number of copies to print using said user interface on said memory device.

* * * * *